United States Patent
Crosta et al.

(10) Patent No.: US 7,654,363 B2
(45) Date of Patent: Feb. 2, 2010

(54) TURBOSHAFT ENGINE THAT REDUCES REAR NOISE EMISSIONS

(75) Inventors: Franck Crosta, Leguevin (FR); Damien Prat, Colomiers (FR)

(73) Assignee: Airbus France, Toulouse (FR)

( * ) Notice: Subject to any disclaimer, the term of this patent is extended or adjusted under 35 U.S.C. 154(b) by 156 days.

(21) Appl. No.: 11/913,653

(22) PCT Filed: May 11, 2006

(86) PCT No.: PCT/FR2006/001052

§ 371 (c)(1),
(2), (4) Date: Nov. 5, 2007

(87) PCT Pub. No.: WO2006/123035

PCT Pub. Date: Nov. 23, 2006

(65) Prior Publication Data

US 2008/0217101 A1     Sep. 11, 2008

(30) Foreign Application Priority Data

May 18, 2005   (FR) ................... 05 04963

(51) Int. Cl.
*F02K 1/00* (2006.01)
(52) U.S. Cl. .................. 181/213; 181/210; 244/1 N
(58) Field of Classification Search .......... 181/210, 181/213; 415/119; 244/1 N
See application file for complete search history.

(56) References Cited

U.S. PATENT DOCUMENTS

| | | | | |
|---|---|---|---|---|
| 5,353,598 | A * | 10/1994 | Huck et al. .................. 60/725 |
| 5,402,964 | A * | 4/1995 | Wygnanski .................. 244/1 N |
| 5,775,095 | A * | 7/1998 | Zysman et al. ................ 60/204 |
| 5,934,607 | A * | 8/1999 | Rising et al. ................ 244/1 N |
| 6,314,721 | B1 * | 11/2001 | Mathews et al. .............. 60/264 |
| 6,502,383 | B1 * | 1/2003 | Janardan et al. ............ 60/226.1 |
| 6,571,549 | B1 * | 6/2003 | Stanek ........................ 60/262 |
| 6,606,854 | B1 * | 8/2003 | Siefker et al. ................ 60/262 |
| 2002/0139120 | A1 | 10/2002 | Sheoran et al. |
| 2002/0189896 | A1 * | 12/2002 | Tse ............................ 181/213 |
| 2004/0074224 | A1 * | 4/2004 | Hebert ........................ 60/204 |
| 2005/0060982 | A1 * | 3/2005 | Mani et al. ................. 60/226.1 |
| 2006/0011408 | A1 * | 1/2006 | Kempton et al. ............ 181/214 |

OTHER PUBLICATIONS

International Search Report dated Sep. 4, 2006.

* cited by examiner

*Primary Examiner*—Jeffrey Donels
*Assistant Examiner*—Forrest M Phillips
(74) *Attorney, Agent, or Firm*—Dickinson Wright PLLC

(57) ABSTRACT

A turboengine that reduces rear noise emissions has a thickness of a rear part of a sound-attenuating coating, which is borne internally by an external fan cowl, that is increased toward a front part of the sound-attenuating coating. An increased-thickness zone is connected to a pan of the coating, located in a critical area of a jet nozzle, by a surface having a curved profile.

6 Claims, 2 Drawing Sheets

TURBOSHAFT ENGINE THAT REDUCES REAR NOISE EMISSIONS

FIELD OF THE INVENTION

The present invention relates to a method of reducing the sound emissions at the rear of a bypass turboengine for aircraft, as well as to a turboengine improved by the implementation of this method.

BACKGROUND OF THE RELATED ART

It is known that bypass turboengines comprise a nacelle delimiting at the front an air inlet and containing a cold stream fan, a hot stream central generator and a fan channel with annular section provided with a nozzle for the cold stream, said fan channel being formed between an internal cowl surrounding said hot stream central generator and the internal tubular face of an acoustic attenuation coating with annular section carried internally by an external fan cowl forming the rear of said nacelle, said coating comprising a front part, disposed upstream of said nozzle and exhibiting an optimal thickness for the acoustic attenuation of the noise produced by said fan and conveyed by said cold stream, as well as a rear part, contiguous with said front part and disposed on either side of the throat of said nozzle, said rear coating part exhibiting a thickness which decreases towards the rear edge of said external fan cowl delimiting the annular ejection orifice for said cold stream, and said front coating part having, in the vicinity of its junction with said rear coating part, a convergent zone in which its internal tubular face begins to converge towards said nozzle.

Since the rear part of said acoustic attenuation coating exhibits a decreasing thickness which is less than said optimal thickness of the front part—except possibly at the junction with the latter—this rear part may not exhibit optimal attenuation characteristics.

Moreover, the shape of the internal tubular face of the acoustic attenuation coating, in particular opposite said nozzle—that is to say at the level of said rear part—is determined in order that, in combination with the shape of said internal cowl of the hot stream central generator, the performance of said nozzle—and therefore that of said turboengine—is optimal. It is not therefore possible to modify the shape of said internal tubular face of the acoustic attenuation coating without degrading the performance of the turboengine.

SUMMARY OF THE INVENTION

The Applicant has however found that, under certain conditions, it was possible greatly to increase the acoustic attenuation of the rear part of said coating by modifying the shape thereof, while only slightly degrading, in an acceptable manner, the performance of the turboengine.

To this end, according to the invention, the method of reducing the sound emissions at the rear of a bypass turboengine of the type recalled below is noteworthy in that:
- a critical zone of the fan channel, beginning at said nozzle throat and extending frontwards is determined, in which any possible geometric modification of said fan channel, and therefore of the internal tubular face of the rear coating part, is impossible without demanding a modification of the parameters of said nozzle;
- in said convergent zone of the front coating part, the internal tubular face is modified in the sense of a progressive increase in the thickness of said coating towards said rear coating part and this progressive modification in the internal tubular face of the contiguous rear coating part is continued until a zone of the latter with increased thickness is approximately equal to said optimal thickness; and
- the rear end of said zone with increased thickness is linked to the front end of said critical zone by an internal tubular face with inflection profile.

Thus, by virtue of the invention, the acoustic attenuation properties of said rear coating part are augmented by endowing the front zone of the latter—front zone which in certain cases can exhibit an axial length of the order of a quarter of the total axial length of said rear coating part—with a thickness equal to said optimal thickness of the front coating part.

The extent of said critical zone is preferably determined by the fact that the Mach number of the cold stream thereat goes from about 0.8 (at the front) to about 1 (at the throat). Any geometric modification of the internal tubular face of said acoustic attenuation coating in this critical zone must be avoided, since it would modify the parameters of the nozzle in a non-negligible manner.

Moreover, as regards the progressive shape modification of the acoustic attenuation coating, it is advantageous that it begin in said convergent zone, in which the cold stream accelerates, since said modification begins at a relatively low Mach number, lying for example between 0.4 and 0.55. It follows from this that, from said convergent zone of the front coating part to the front end of the critical zone, the shape modification (including said internal tubular face with inflection profile) takes place in a span of Mach numbers lying between about 0.45 and 0.8.

Of course, said internal tubular face with inflection profile must in no case produce an inversion of the pressure gradient, which would have the immediate effect of causing the boundary layer to detach. For this purpose, the shape parameter Hi of said inflection profile must remain less than 1.6.

From the foregoing, it is noted that the bypass turboengine improved according to the method of the invention is noteworthy in that the acoustic attenuation coating with annular section carried internally by said external fan cowl comprises an inflection profile between an upstream zone, in which the thickness of said coating is at least approximately equal to an optimal thickness E, and said critical zone of the nozzle.

BRIEF DESCRIPTION OF THE DRAWINGS

The figures of the appended drawing will clearly elucidate how the invention can be carried out. In these figures, identical references designate similar elements.

DETAILED DESCRIPTION OF THE INVENTION

Figure 1:
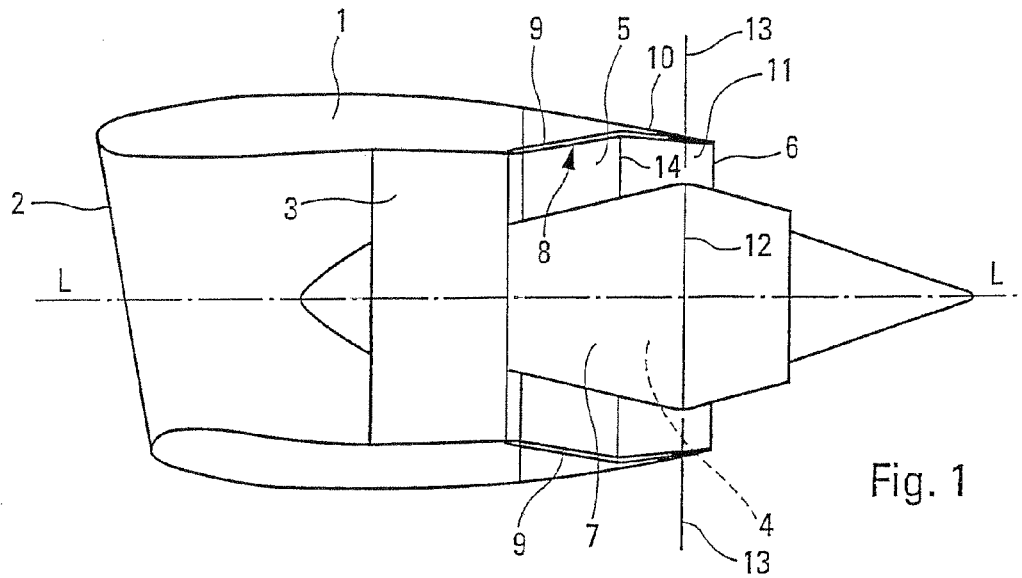
FIG. 1 is a diagrammatic axial cross-section through a bypass turboengine.

The known bypass engine for aircraft, diagrammatically shown in FIG. 1 in cross-section passing through its longitudinal axis L-L, comprises a nacelle 1 delimiting, at the front, an air inlet 2. The nacelle 1 contains a fan 3, a hot stream central generator 4 and an annular fan channel 5 traversed by the cold stream.

Figure 2:
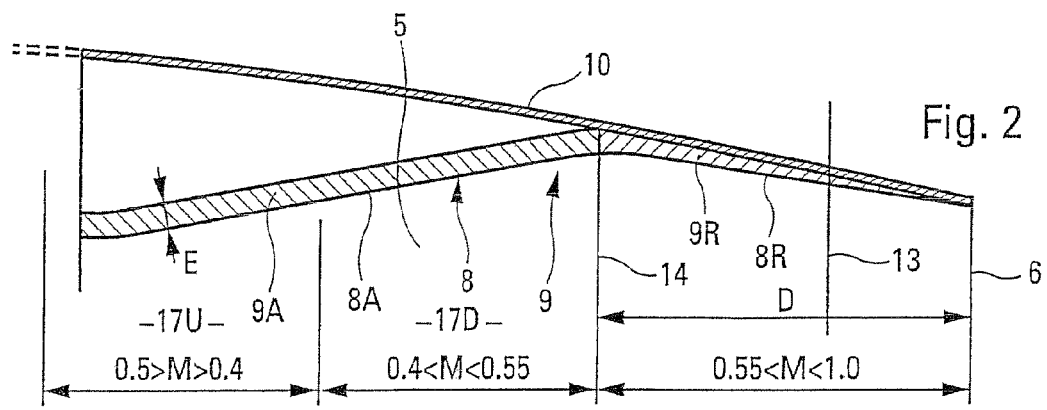
FIG. 2 is a magnified diagrammatic cross-sectional view illustrating the known acoustic attenuation tubular coating envisaged in the fan channel of the turboengine of FIG. 1.

The fan channel 5 is provided with an annular ejection orifice 6 corresponding to the trailing edge of the nacelle 1. This fan channel 5 is formed between a cowl 7, surrounding said hot stream central generator 4, and the internal face 8 (see FIG. 2) of an internally by an external fan cowl 10, forming the rear part of said nacelle 1.

In the fan channel 5, the cowl 7 and the internal face 8 form a nozzle 11, which emerges through the annular ejection orifice 6 and whose throat 12 is situated in a plane 13 transverse with respect to the longitudinal axis L-L.

The acoustic attenuation tubular coating 9, for example of known type with absorbent cells, consists of two contiguous parts 9A and 9R, having respective internal faces 8A and 8R forming said internal face 8, and adjacent along a line 14, whose plane is orthogonal to said axis L-L. The front part 9A, disposed well upstream of the nozzle 11, exhibits a thickness E, at least approximately constant, corresponding to an optimal attenuation of the noise produced by the fan 3 and conveyed by the cold stream circulating in the fan channel 5. On the other hand, the rear part 9R, which is disposed on either side of the throat 12 of the nozzle 11 and which extends over an axial length D, exhibits a thickness which decreases in a uniform manner from said line 14—where it is equal to the optimal thickness E—to the annular ejection orifice 6. Of course, on account of its decreasing thickness, which is less than the optimal value E (except on the line 14), the rear part 9R could not offer an optimal acoustic attenuation.

In the arrangement described above, the cold stream in the fan channel is subsonic and such that:
  opposite the rear part 9R of the acoustic attenuation coating 9, the Mach number goes from about 0.55, at the level of the line 14, to about 1.0, at the level of the annular ejection orifice 6; and
  opposite the front part 9A of said coating 9, there exists:
    a divergent upstream zone 17U, in which said cold stream slows, the Mach number thereat going from about 0.5 to about 0.4; and
    a convergent downstream zone 17D, in which said cold stream accelerates, the Mach number thereat going from about 0.4 to about 0.55.

Figure 3:
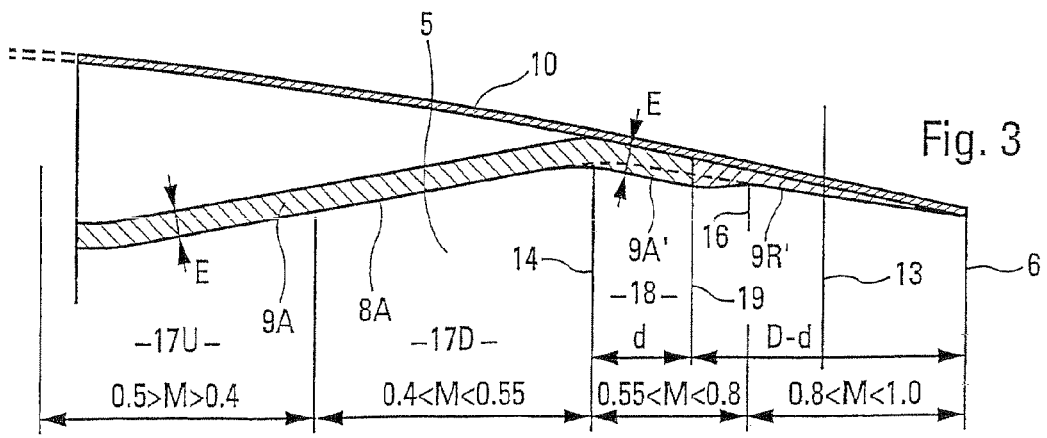
FIG. 3 shows, in a view similar to FIG. 2, the acoustic attenuation tubular coating improved in accordance with the present invention.

As indicated above, the object of the present invention is to increase, towards the rear, the front part 9A of optimal thickness E of a zone 9A' of length d so as to reduce the rear part 9R with decreasing thickness to a zone 9R' of reduced length D-d (see FIG. 3), while only negligibly degrading the performance of the turboengine.

Figure 4:
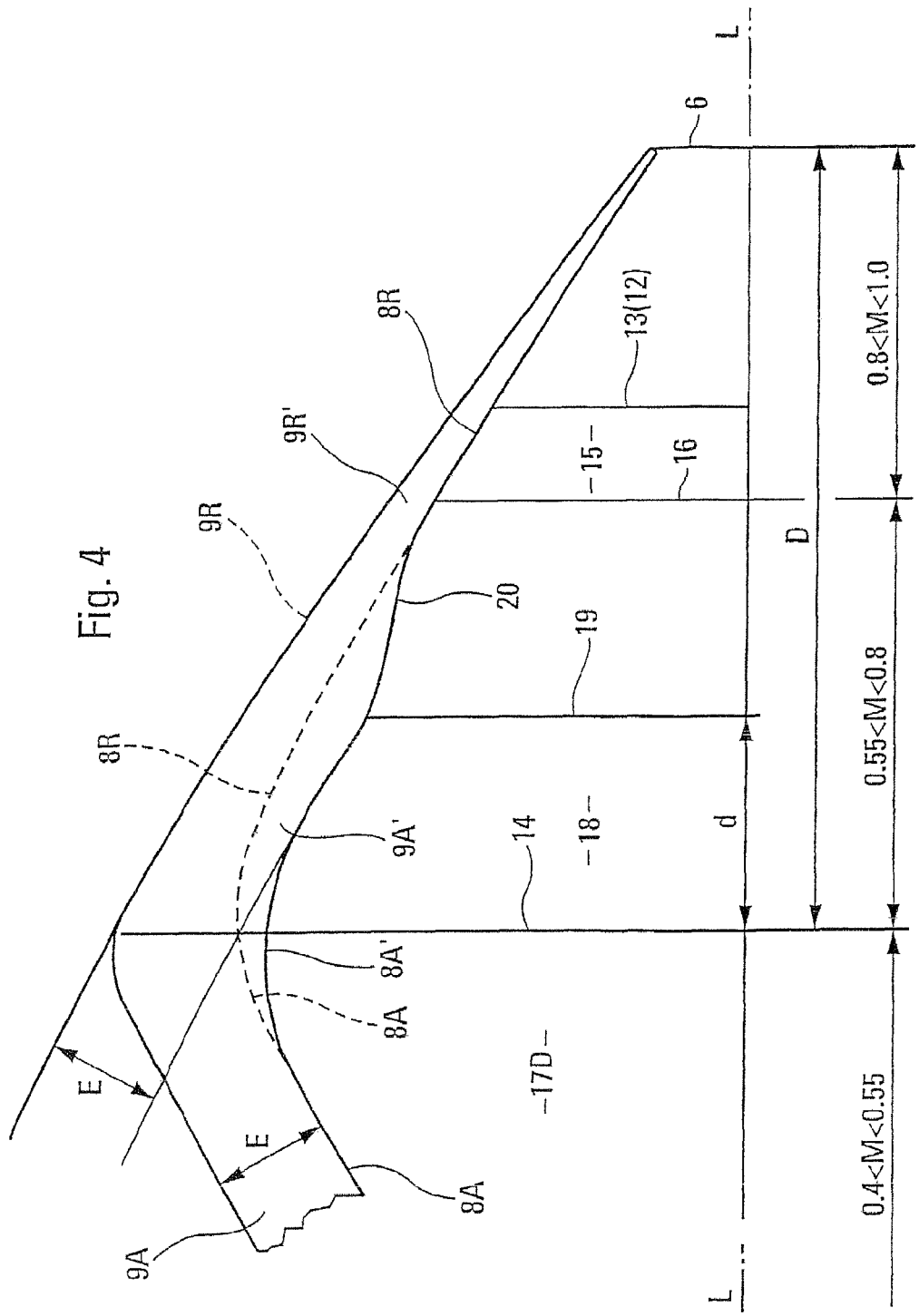
FIG. 4 is a magnified view, dilated orthogonally to the axis of said turboengine, of a part of FIG. 3 at the level of the improvement of the acoustic attenuation tubular coating in accordance with the present invention.

Therefore, as illustrated on a larger scale in FIG. 4:
  we begin by determining a critical zone 15 of the fan channel 5, beginning with the plane 13 of the nozzle throat 12 and extending towards the front as far as a front boundary 16, critical zone in which any geometric modification of the internal tubular face 8R of the rear coating part 9R is impossible without demanding a modification of the parameters of said nozzle 12. The critical zone 15 is for example determined by the fact that, at said front boundary 16, the Mach number of the cold stream already attains a value at least approximately equal to 0.8, to attain a value of about 1 at the nozzle throat 12;
  in the downstream zone 17D opposite the front coating part 9A in which the latter begins to converge towards the nozzle throat 12, and in which the Mach number of the cold stream lies between about 0.4 and about 0.55, the internal tubular face 8A is modified in the sense of a progressive increase in the thickness (see the line 8A') of said coating, towards the rear coating part 9 and this progressive increase in the internal tubular face of the contiguous rear coating part is continued until a zone 18 of the latter, of length d and with increased thickness, is obtained in which the thickness is at least equal to said optimal thickness E; and
  the rear end 19 of said zone 18 is linked to the front end 16 of the critical zone 15 by an internal tubular face with inflection profile 20, whose shape parameter Hi is at most equal to 1.6.

Thus, the length d of the zone 18 is defined by the position of the nozzle throat 12, the axial extent of the critical zone 15 and the axial extent of the internal tubular face with inflection profile 20. This length d can, in certain cases, be in the vicinity of a quarter of the length D of the rear coating part 9R, so that a significant increase in acoustic attenuation is achieved without however overly degrading the operation of the turboengine.

The invention claimed is:

1. A bypass turboengine of an aircraft, the turboengine comprising:
  a nacelle that delimits the front an air inlet and includes a cold stream fan, a hot stream central generator, and a fan channel with an annular section having a nozzle for the cold stream, wherein:
  the fan channel is formed between an internal cowl surrounding the hot stream central generator and an internal tubular face of an acoustic attenuation coating with the annular section carried internally by an external fan cowl forming the rear of the nacelle,
  the coating comprises:
    a front part, disposed upstream of the nozzle, having an optimal thickness for the acoustic attenuation of the noise produced by the fan and conveyed by the cold stream, and
    a rear part, contiguous with the front part and disposed on either side of the throat of the nozzle, the rear coating part having a thickness that decreases towards the rear edge of the external fan cowl delimiting an annular ejection orifice for the cold stream,
  the front coating part has, in the vicinity of its junction with the rear coating part, a convergent zone in which its internal tubular face begins to converge towards the nozzle,
  a critical zone of the fan channel is defined, beginning at the nozzle throat and extending frontward, in which any possible geometric modification of the fan channel and the internal tubular face of the rear coating part is impossible without a modification of parameters of the nozzle,
  in the convergent zone of the front coating part, the internal tubular face has a progressive increase in the thickness of the coating towards the rear coating part and this progressive modification in the internal tubular face of the contiguous rear coating part is continued until a zone of the latter with increased thickness is obtained in which the thickness is at least equal to the optimal thickness, and
  the rear end of the zone with increased thickness is linked to the front end of the critical zone by an internal tubular face with an inflection profile.

2. The bypass turboengine of claim 1, wherein the front boundary of the critical zone is defined such that the Mach number of the cold stream thereat is at least approximately equal to 0.8.

3. The bypass turboengine of claim 1, wherein in the convergent zone of the front part of the coating, the progressive shape modification begins when the Mach number of the cold stream lies between about 0.4 and about 0.55.

4. The bypass turboengine of claim 1, wherein the inflection profile is configured not to produce any detachment of the boundary layer.

5. The bypass turboengine of claim 4, wherein the shape parameter of the inflection profile is at most equal to 1.6.

6. The bypass turboengine of claim 1, wherein the acoustic attenuation coating with the annular section carried internally by the external fan cowl comprises an inflection profile disposed between an upstream zone, in which the thickness of the coating is at least approximately equal to an optimal thickness, and the critical zone of the nozzle.

* * * * *